United States Patent
Ohmi et al.

(10) Patent No.: US 9,010,369 B2
(45) Date of Patent: Apr. 21, 2015

(54) FLOW RATE RANGE VARIABLE TYPE FLOW RATE CONTROL APPARATUS

(71) Applicants: Fujikin Incorporated, Osaka (JP); National University Corporation Tohoku University, Miyagi (JP); Tokyo Electron Ltd., Tokyo (JP)

(72) Inventors: Tadahiro Ohmi, Miyagi (JP); Masahito Saito, Tokyo (JP); Shoichi Hino, Tokyo (JP); Tsuyoshi Shimazu, Miyagi (JP); Kazuyuki Miura, Miyagi (JP); Kouji Nishino, Osaka (JP); Masaaki Nagase, Osaka (JP); Katsuyuki Sugita, Osaka (JP); Kaoru Hirata, Osaka (JP); Ryousuke Dohi, Osaka (JP); Takashi Hirose, Osaka (JP); Tsutomu Shinohara, Osaka (JP); Nobukazu Ikeda, Osaka (JP); Tomokazu Imai, Osaka (JP); Toshihide Yoshida, Osaka (JP); Hisashi Tanaka, Osaka (JP)

(73) Assignees: Fujikin Incorporated, Osaka (JP); National University Corporation Tohoku University, Miyagi (JP); Tokyo Electron Ltd., Tokyo (JP)

( * ) Notice: Subject to any disclaimer, the term of this patent is extended or adjusted under 35 U.S.C. 154(b) by 0 days.

(21) Appl. No.: 13/763,178

(22) Filed: Feb. 8, 2013

(65) Prior Publication Data

US 2013/0220451 A1 Aug. 29, 2013

Related U.S. Application Data

(62) Division of application No. 11/913,277, filed as application No. PCT/JP2006/312952 on Jun. 22, 2006, now Pat. No. 8,418,714.

(30) Foreign Application Priority Data

Jun. 27, 2005 (JP) ................................. 2005-185845

(51) Int. Cl.
*G05D 7/06* (2006.01)
*G01F 1/36* (2006.01)

(Continued)

(52) U.S. Cl.
CPC ............. *G05D 7/0641* (2013.01); *G01F 1/363* (2013.01); *G01F 1/6842* (2013.01);
(Continued)

(58) Field of Classification Search
USPC .......... 137/599.06, 599.07, 487, 488, 601.01, 137/601.13, 601.14
See application file for complete search history.

(56) References Cited

U.S. PATENT DOCUMENTS 1,938,460 A 12/1933 Muff
(Continued)

FOREIGN PATENT DOCUMENTS

JP 3-033566 2/1991
(Continued)

OTHER PUBLICATIONS

International Search Report issued in corresponding application No. PCT/JP2006/31295, dated Sep. 6, 2006, mailed Sep. 19, 2006.
(Continued)

*Primary Examiner* — William MccAlister
(74) *Attorney, Agent, or Firm* — Griffin & Szipl, P.C.

(57) ABSTRACT

A pressure type flow rate control apparatus is provided wherein flow rate of fluid passing through an orifice is computed as $Qc=KP1$ (where K is a proportionality constant) or as $Qc=KP2^m(P1-P2)^n$ (where K is a proportionality constant, m and n constants) by using orifice upstream side pressure P1 and/or orifice downstream side pressure P2. A fluid passage between the downstream side of a control valve and a fluid supply pipe of the pressure type flow rate control apparatus comprises at least 2 fluid passages in parallel, and orifices having different flow rate characteristics are provided for each of these fluid passages, wherein fluid in a small flow quantity area flows to one orifice for flow control of fluid in the small flow quantity area, while fluid in a large flow quantity area flows to the other orifice for flow control of fluid in the large flow quantity area.

3 Claims, 5 Drawing Sheets

(51) Int. Cl.
*G01F 1/684* (2006.01)
*G01F 5/00* (2006.01)
*G01F 7/00* (2006.01)

(52) U.S. Cl.
CPC ............. *G01F 1/6847* (2013.01); *G01F 5/005* (2013.01); *G01F 7/005* (2013.01); *G05D 7/0647* (2013.01); *G05D 7/0635* (2013.01)

(56) References Cited

U.S. PATENT DOCUMENTS

| | | | | |
|---|---|---|---|---|
| 2,229,903 | A * | 1/1941 | Schmohl et al. | 137/599.05 |
| 3,081,942 | A * | 3/1963 | Maclay | 341/151 |
| 3,375,845 | A * | 4/1968 | Behm | 137/110 |
| 3,411,669 | A | 11/1968 | Puster | |
| 3,827,457 | A * | 8/1974 | Vutz et al. | 137/599.07 |
| 3,830,256 | A * | 8/1974 | Cox | 137/599.04 |
| 3,831,845 | A * | 8/1974 | Pacht | 239/76 |
| 3,905,394 | A * | 9/1975 | Jerde | 137/599.04 |
| 3,963,043 | A * | 6/1976 | Cota et al. | 137/487.5 |
| 3,999,572 | A * | 12/1976 | Mohr | 137/599.07 |
| 4,030,523 | A * | 6/1977 | Cram et al. | 137/599.07 |
| 4,089,007 | A * | 5/1978 | Perry et al. | 347/6 |
| 4,313,465 | A * | 2/1982 | Holzem et al. | 137/599.07 |
| 4,431,020 | A | 2/1984 | Kowalski | |
| 4,478,246 | A * | 10/1984 | Sherrod | 137/557 |
| 4,518,011 | A * | 5/1985 | Stoll | 137/596.17 |
| 4,633,911 | A | 1/1987 | Lohn | |
| 4,979,639 | A * | 12/1990 | Hoover et al. | 222/1 |
| 5,069,252 | A | 12/1991 | Kendrick et al. | |
| 5,269,334 | A * | 12/1993 | Eastman | 137/12 |
| 5,329,965 | A * | 7/1994 | Gordon | 137/599.07 |
| 5,645,866 | A * | 7/1997 | Eckardt et al. | 425/130 |
| 5,669,408 | A | 9/1997 | Nishino et al. | |
| 5,735,787 | A * | 4/1998 | Lorey | 494/5 |
| 5,791,369 | A | 8/1998 | Nishino et al. | |
| 5,816,285 | A | 10/1998 | Ohmi et al. | |
| 5,875,817 | A * | 3/1999 | Carter | 137/599.06 |
| 5,938,425 | A * | 8/1999 | Damrath et al. | 431/62 |
| 6,314,992 | B1 | 11/2001 | Ohmi et al. | |
| 6,422,264 | B2 | 7/2002 | Ohmi et al. | |
| 6,539,968 | B1 | 4/2003 | White et al. | |
| 6,591,851 | B1 * | 7/2003 | Palten et al. | 137/12 |
| 6,997,202 | B2 * | 2/2006 | Olander | 137/2 |

FOREIGN PATENT DOCUMENTS

| | | |
|---|---|---|
| JP | 06-004139 | 1/1994 |
| JP | 08-087335 | 4/1996 |
| JP | 8-338546 | 12/1996 |
| JP | 09-330128 | 12/1997 |
| JP | 10-055218 | 2/1998 |
| JP | 11-125398 | 5/1999 |
| JP | 11-265215 | 9/1999 |
| JP | 11-265216 | 9/1999 |
| JP | 2000-020135 | 1/2000 |
| JP | 2000-322130 | 11/2000 |
| JP | 2000-66732 | 9/2001 |
| JP | 2003-195948 | 7/2003 |
| JP | 2004-510225 | 4/2004 |
| JP | 2004-199109 | 7/2004 |
| JP | 2004-243333 | 9/2004 |
| JP | 2004-278614 | 10/2004 |
| JP | 2005-115501 | 4/2005 |
| JP | 2005-149075 | 6/2005 |
| JP | 2005-180527 | 7/2005 |
| WO | 02-25391 | 3/2002 |

OTHER PUBLICATIONS

International Search Report and Written Opinion completed Jul. 11, 2006 and mailed Jul. 25, 2006 in related international application No. PCT/JP2006/309368.
http://www.weisz.com/information/tablas%20tecnicas_pdf/Steel_grades_equivalence_table.pdf, downloaded Sep. 20, 2012.
Office Action issued on Jun. 25, 2012 in co-pending related U.S. Appl. No. 11/913,271.

* cited by examiner

Flow rate characteristics outside FCS critical expansion range: Standard type FCS·10~100% for the flow rate control range at the time when downstream side pressure is 100 Torr

US 9,010,369 B2

FLOW RATE RANGE VARIABLE TYPE FLOW RATE CONTROL APPARATUS

This is a Divisional Application of U.S. Ser. No. 11/913,277, filed Feb. 16, 2010, which is a National Phase Application in the United States of International Patent Application No. PCT/JP2006/312952 filed Jun. 22, 2006, which claims priority on Japanese Patent Application No. 2005-185845, filed Jun. 27, 2005. The entire disclosures of the above patent applications are hereby incorporated by reference.

FIELD OF THE INVENTION

The present invention relates to a flow rate control apparatus with a fluid supply system used for semiconductor manufacturing facilities, chemical products manufacturing facilities, pharmaceutical products manufacturing facilities, food products manufacturing facilities, and the like. More particularly, the present invention relates to a flow rate range variable type flow rate control apparatus with which both the expansion of a flow rate control range and the maintenance of high control accuracy can be easily achieved with a pressure type flow rate control apparatus and a thermal type mass flow rate control apparatus.

BACKGROUND OF THE INVENTION

Not only is high flow rate control accuracy required for a flow rate control apparatus used with semiconductor manufacturing facilities, and the like, but also a considerably wide control range is required with regard to the flow rate control range. As the required flow rate control range becomes greater, it is inevitable that control accuracy is lowered in low flow rate situations. Thus, it is difficult to make up for the degradation of control accuracy in a low flow rate state using only a flow rate control apparatus provided with a feature with which to correct a measured value. To overcome this problem in a general way, a flow rate control range may be divided into a plurality of flow rate areas, e.g. the area for a large flow quantity, the area for a medium flow quantity and the area for a small flow quantity, in order to meet a required flow rate control range. This solution, however, involves providing 3 sets of flow rate control apparatuses, each one responsible for the flow rate control of one of each one of the flow rate areas in parallel so that high flow rate control accuracy can be maintained over a wide flow rate control range.

However, in a system, in which a plurality of devices responsible for different flow rate control ranges, respectively, are provided in parallel, installation costs unavoidably go up, which makes it difficult to reduce the installation costs. At the same time, switching operations of flow rate control apparatuses become time-consuming and troublesome. Also, with respect to semiconductor manufacturing facilities, it has become more popular these days to replace the conventional thermal type mass flow rate control apparatus with a pressure type flow rate control apparatus. The reason for this replacement is that a pressure type flow rate control apparatus is not only simple in structure, but also has excellent properties with respect to responsiveness, control accuracy, control stabilities, manufacturing costs, maintainability, and the like. Furthermore, a flow rate control apparatus can be easily replaced with a thermal type mass flow rate control apparatus.

FIG. 7(a) and FIG. 7(b) illustrate one example of the basic structure of the afore-mentioned conventional pressure type flow rate control apparatus FCS. A major portion of the pressure type flow rate control apparatus FCS comprises a control valve 2, pressure detectors 6, 27, an orifice 8, flow rate computation circuits 13, 31, a flow rate setting circuit 14, a computation control circuit 16, a flow rate output circuit 12, and the like.

In FIG. 7(a) and FIG. 7(b), 3 designates an orifice upstream side pipe; 4 designates a valve driving part; 5 designates an orifice downstream side pipe; 9 designates a valve; 15 designates a flow rate conversion circuit; 10, 11, 22, 28 designate amplifiers; 7 designates a temperature detector; 17, 18, 29 designate A/D converters; 19 designates a temperature correction circuit; 20, 30 designate computation circuits; 21 designates a comparison circuit; Qc designates a computation flow rate signal; Qf designates a switching computation flow rate signal; Qe designates a flow rate setting signal; Qo designates a flow rate output signal; Qy designates a flow rate control signal; $P_1$ designates orifice upstream side gas pressure; $P_2$ designates orifice downstream side gas pressure; and k designates a flow rate conversion rate. The afore-mentioned pressure type flow rate control apparatus FCS shown in FIG. 7(a) is mainly used either in the case where the ratio $P_2/P_1$ of the orifice upstream side gas pressure $P_1$ and the orifice downstream side gas pressure $P_2$ is equal to the critical value of a fluid, or in the case where the ratio $P_2/P_1$ is lower than the critical value (that is, when a gas flow is constantly under the critical state). The gas flow rate Qc passing through the orifice 8 is given by $Qc=KP_1$ (where K is a proportionality constant).

The afore-mentioned pressure type flow rate control apparatus FCS shown in FIG. 7(b) is mainly used for the flow rate control of gases that will be in the flow condition in both the critical and non-critical states. The flow rate of a gas passing through an orifice is given, in this case, by $Qc=KP_2^m(P_1-P_2)^n$ (where K is a proportionality constant, m and n are constants).

With the afore-mentioned pressure type flow rate control apparatus in FIG. 7(a) and FIG. 7(b), the setting value of the flow rate is given by a voltage value as Qe, the flow rate setting signal. For example, suppose that the pressure control range 0~3 (kgf/cm² abs) of the upstream side pressure $P_1$ is expressed by the voltage range 0~5V, then Qe=5V (full scale value) becomes equivalent to the flow rate $Qc=KP_1$ at the pressure $P_1$ of 3 (kgf/cm² abs). For instance, when the conversion rate k of the flow rate conversion circuit 15 is set at 1, a switching computation flow rate signal Qf (Qf=kQc) becomes 5V if the flow rate setting signal Qe=5V is inputted; thus, a control valve 2 is operated for opening and closing until the upstream side pressure $P_1$ becomes 3 (kgf/cm² abs) in order to allow the gas of flow rate $Qc=KP_1$, corresponding to $P_1$=3 (kgf/cm² abs), to flow through the orifice 8.

In the case where the pressure range to control is switched to 0~2 (kgf/cm² abs), and the pressure range is expressed by a flow rate setting signal Qe of 0~5(V) (that is, when a full scale value 5V gives 2 (kgf/cm² abs)), the afore-mentioned flow rate conversion rate k is set at 2/3. As a result, if a flow rate setting signal Qe=5(V) is inputted, the switching computation flow rate signal Qf becomes Qf=5×2/3(V) because of the relationship Qf=kQc. And thus, the control valve 2 is operated for opening and closing until the upstream side pressure $P_1$ becomes 3×2/3=2 (kgf/cm² abs).

In other words, the full scale flow rate is converted so that Qe=5V expresses a flow rate $Qc=KP_1$ equivalent to $P_1$=2 (kgf/cm² abs). Under a critical condition, the flow rate Qc of a gas passing through the orifice 8 is given by the afore-mentioned equation $Qc=KP_1$. However, when the type of gas whose flow rate is to be controlled changes, then the afore-mentioned proportionality constant K also changes if the same orifice 8 is in use.

It is also same, in principle, with the afore-mentioned pressure type flow rate control apparatus in FIG. 7(b). The flow rate Qc of a gas passing through the orifice 8 is given by $Qc=KP_2^m (P_1-P_2)^n$ (where K is a proportionality constant, and m and n are constants). When the type of gas changes, the afore-mentioned proportionality constant K also changes.

[Patent Document 1] TOKU-KAI-HEI No. 8-338546 Public Bulletin

[Patent Document 2] TOKU-KAI No. 2000-66732 Public Bulletin

[Patent Document 3] TOKU-KAI No. 2000-322130 Public Bulletin

[Patent Document 4] TOKU-KAI No. 2003-195948 Public Bulletin

[Patent Document 5] TOKU-KAI No. 2004-199109 Public Bulletin

OBJECTS OF THE INVENTION

With a pressure type flow rate control apparatus, especially with an apparatus that employs the method with which computation control is performed as a flow rate $Qc=KP_1$ under the critical state as shown in FIG. 7(a), the flow rate control range becomes gradually narrower as the orifice secondary side pressure $P_2$ (that is, a chamber and the like to which a gas is supplied) rises. The reason for this is that because the orifice primary side pressure $P_1$ is controlled at a certain pressure value complying with a flow rate setting value, it is inevitable that the correction range of the orifice primary side pressure $P_1$, that is, the control range of a flow rate Qc by means of $P_1$, becomes narrower as the orifice secondary side pressure $P_2$ rises under the conditions in which $P_2/P_1$ satisfies the critical expansion conditions.

The flow state of a fluid falling outside the afore-mentioned critical state makes the accuracy of a flow rate control substantially reduced. As a result, unevenness in quality is caused with semiconductor products. In other words, with a pressure type flow rate control apparatus, wherein the flow rate control of a fluid is conducted under a critical state, the possible range available to achieve flow rate control is substantially narrowed in comparison with the possible range available for a conventional thermal type mass flow rate control apparatus or so-called differential pressure type flow rate control apparatus. As a result, manufacturing costs of semiconductor manufacturing facilities, and the like, go up for the reason that two pressure type flow rate control apparatuses having different flow rate control ranges are required.

The present invention solves the afore-mentioned problems encountered with a conventional flow rate control apparatus, that is, (a) the difficulty in reducing manufacturing costs of a flow rate control apparatus because it becomes necessary that a plurality of flow rate control apparatuses, having different flow rate ranges, are installed in parallel to secure a prescribed control accuracy in the case where a wide flow rate control range is required and thus are used in the manner of switching them, and solves (b) another problem wherein the pressure type flow rate control apparatus, which is basically used for a flow rate control under a critical condition, encounters a flow rate control range that is gradually reduced in view of the pressure rise on the orifice secondary side, which would ordinarily require a plurality of flow rate control apparatuses having different flow rate ranges to be employed to deal with the matter. It is a primary object of the present invention, therefore, to provide a flow rate range variable type flow rate control apparatus, which makes it possible that a highly accurate flow rate control of a fluid is achieved over a wide flow rate control range using only one set of a flow rate control apparatus by means of switching and controlling fluid passages inside the flow rate control apparatus.

DISCLOSURE OF THE INVENTION

To overcome difficulties with the afore-mentioned flow rate control apparatuses, the present invention as claimed in a first embodiment of the invention is basically constituted so that a flow rate is controlled by means of switching fluid for flowing in a large flow quantity range and fluid for flowing in a small flow quantity range in a manner so that fluid passages connected to a flow rate detection part of the flow rate control apparatus are installed at least for small flow quantity and large flow quantity. With this feature, the first embodiment of the present invention makes fluid flowing in the small flow quantity range flow to the flow detection part through the afore-mentioned fluid passage for small flow quantity, switches the detection level of the flow rate control part to a detection level suitable for the detection of fluid flowing in the small flow rate range and also makes fluid flowing in the large flow quantity range flow to the flow detection part through the afore-mentioned fluid passage for large flow quantity, and switches the detection level suitable for the detection of fluid flowing in the large flow quantity range.

Also, to overcome difficulties with the afore-mentioned invention, the present invention, in accordance with a second embodiment, is basically constituted with a pressure type flow rate control apparatus wherein a flow rate of fluid passing through an orifice 8 is computed as $Qc=KP_1$ (where K is a proportionality constant), or as $Qc=KP_2^m (P_1-P_2)^n$ (where K is a proportionality constant, m and n constants), by using an orifice upstream side pressure $P_1$ and/or an orifice downstream side pressure $P_2$, and a fluid passage between the downstream side of a control valve and a fluid supply pipe of the pressure type flow rate control apparatus is made to be more than at least 2 fluid passages in parallel, wherein orifices having different flow rate characteristics are provided with the afore-mentioned fluid passages arranged in parallel. In accordance with the second embodiment, the afore-mentioned fluid flowing in the small flow quantity range is made to flow to one orifice for the flow control of the fluid flowing in the small flow quantity range, and the fluid flowing in the large flow quantity range is made to flow to the other orifice for the flow control of the fluid flowing in the large flow quantity range.

The present invention, in accordance with a third embodiment of the present invention, further modifies the second embodiment so that the number of fluid passages arranged in parallel are made to be 2, and there are two orifices provided, one for large flow quantity and the other for small flow quantity, and thus the control range of a fluid's flow rate is switched either to the small flow quantity range or to the large flow quantity range by means of operating a switching valve installed on the fluid passage of the orifice for large flow quantity.

The present invention, in accordance with a fourth embodiment, further modifies the second embodiment so that 3 different orifices are provided including an orifice for a large flow quantity, an orifice for a medium flow quantity and an orifice for a small flow quantity, and a No. 1 switching valve, a No. 2 switching valve and the orifice for large flow quantity are provided on one fluid passage in series, while the orifice for small flow quantity and the orifice for medium flow quantity are provided on the other fluid passage, and furthermore, the passage for communication between the afore-mentioned 2 switching valves and the passage for communication between the orifice for small flow quantity and the orifice for medium flow quantity are made to be in communication with each other.

The present invention, in accordance with a fifth embodiment, further modifies the second embodiment so that fluid flowing through an orifice of a pressure type flow rate control apparatus is made to be a fluid under a critical condition.

Furthermore, to overcome difficulties with the afore-mentioned invention, the present invention, in accordance with a sixth embodiment, is basically constituted so that a thermal type mass flow rate control apparatus comprises a flow rate control valve; a laminar flow element device part; a flow rate sensor part; and the like, wherein temperature changes in proportion to a mass flow rate of a fluid are detected at the flow rate sensor part, and fluid with a certain set flow rate is made to flow out by means of opening/closing a flow rate control valve based on the detected temperature; a fluid passage to the flow rate control valve is made to be more than at least 2 fluid passages arranged in parallel, wherein each of the afore-mentioned parallel passages are provided with both laminar flow elements with different coarseness and flow rate sensors, wherein the afore-mentioned fluid in flowing the small flow quantity range is made to flow to one laminar flow element for flow rate control of fluid flowing in the small flow quantity range, while the afore-mentioned fluid flowing in the large flow quantity range is made to flow to the other laminar flow element for flow rate control of fluid flowing in the large flow quantity range.

The present invention, in accordance with a seventh embodiment of the invention, further modifies the sixth embodiment so that the number of fluid passages in parallel are made to be 2, and the two laminar flow elements are made to be a coarse laminar flow element for large flow quantity and a fine laminar flow element for small flow quantity, and the control range of fluid flow rate is switched either to the small flow quantity range or to the large flow quantity range by means of operating switching valves respectively provided on both fluid passages.

Effect of the Invention

The present invention is constituted so that flow rate is controlled in a manner wherein flow rate control is performed by appropriately combining an orifice 8c for a large flow quantity, an orifice 8a for a small flow quantity (or an orifice 8c for a large flow quantity, an orifice 8b for a medium flow quantity and an orifice 8a for a small flow quantity), thus making it possible that highly accurate flow rate control may be achieved over a wide flow rate range with an error of less than 1% of the set point. Also, the present invention makes operation of flow rate control simple because a flow rate control range can be automatically selected by operating a switching valve. Furthermore, the present invention can be applied to flow rate control of various kinds of fluid supply facilities because of ease of change of the type of gases supplied by making use of a flow factor F.F. in the case wherein flow rate control of fluid is basically under a critical condition.

LIST OF REFERENCE NUMBERS AND CHARACTERS

Figure 1:
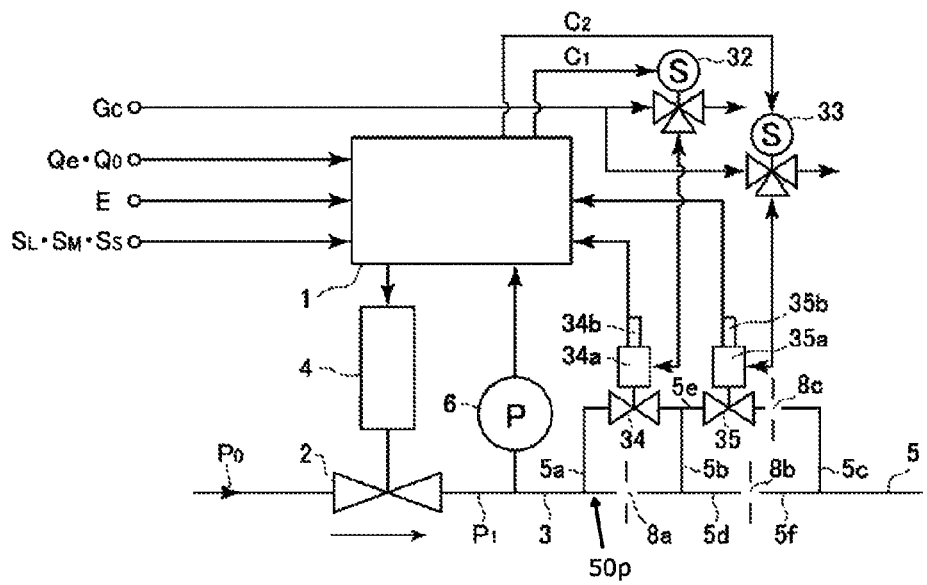
FIG. 1 is a block diagram of a flow rate range variable type flow rate control apparatus according to an embodiment of the present invention.

FCS pressure type flow rate control apparatus
MFC thermal type mass flow rate control apparatus
1 control part
2 control valve
3 orifice primary side pipe
4 driving part
5 fluid supply pipe
6 pressure sensor
8a orifice for a small flow quantity
8b orifice for a medium flow quantity
8c orifice for a large flow quantity
32 No. 1 switching electro-magnetic valve
33 No. 2 switching electro-magnetic valve
34 No. 1 switching valve
34a valve driving part
34b proximity sensor
35 No. 2 switching valve
35a valve driving part
35b proximity sensor
36 control part
36a bridge circuit
37 flow rate control valve
38, 38a, 38b laminar flow element bypasses
39 flow rate sensor part
40a, 40b fluid passages
41, 42 switching valves

BEST MODE OF CARRYING OUT THE INVENTION

Embodiment 1

Referring to the drawings, embodiments of the present invention are described as follows.

FIG. 1 is a block diagram of a flow rate range variable type flow rate control apparatus according to one embodiment of the present invention. In FIG. 1, 1 designates a control part, 2 designates a control valve, 3 designates an orifice upstream side (primary side) pipe, 4 designates a valve driving part, 5 designates a fluid supply pipe, 6 designates a pressure sensor, 8a designates an orifice for a small flow quantity, 8b designates an orifice for a medium flow quantity, 8c designates an orifice for a large flow quantity, 32, 33 designate switching electro-magnetic valves, and 34, 35 designate switching valves. The control part 1, the control valve 2, the valve driving part 4, the pressure sensor 6, and the like, of the afore-mentioned pressure type flow rate control apparatus have been disclosed. With respect to the control part, there are provided flow rate input/output signals (i.e., an input signal of a set flow rate, an output signal of a controlled flow rate·DC 0-5V), terminals Qe, Qo, a power supply terminal (⊥DC 15V) E, and input terminals $S_L$, $S_M$, $S_S$ for providing a controlled flow rate switching command signal.

A first fluid passage 50p is disposed between the downstream side of the control valve 2 and the fluid supply pipe 5.

The afore-mentioned switching electro-magnetic valves 32, 33, which have been disclosed, are air operation type electro-magnetic valves. When switching signals $C_1$, $C_2$ are inputted from the control part 1 so that switching electro-magnetic valves 32, 33 start working and a driving gas (0.4~0.7 MPa) Gc is supplied. Thus, the driving gas Gc is supplied to valve driving parts 34a, 35a of the switching valves, and the switching valves 34, 35 start operating for opening and closing. Furthermore, operation of both switching valves 34, 35 is detected by proximity switches 34b, 35b installed on the valve driving parts 34a, 35a, and a corresponding signal is inputted to the control part 1. With present embodiments of the invention, for each switching valve 34, 35 a pneumatically operated normally closed type valve has been employed.

Pipes 5a, 5b, 5c, 5d, 5e and 5f, shown in FIG. 1, form bypass passages for orifices 8a, 8b, and 8c. When the flow rate to be controlled is in the small flow quantity area, the flow rate of fluid is controlled by orifice 8a for small flow quantity that flows mainly through pipes 5b, 5d, 5c, 5e. When the flow rate to be controlled is in the medium flow quantity range area, fluid flows in the orifice 8b for medium flow quantity through pipes 5a, 5b, 5d, and the flow rate of fluid is controlled mainly by orifice 8b for medium flow quantity that flows out into the fluid supply pipe 5. Furthermore, when the flow rate to be controlled is in the large flow quantity range area, fluid flows out to the orifice 8c for large flow quantity through pipe 5a, and the flow rate of fluid is controlled mainly by orifice 8c for large flow quantity that flows in the fluid supply pipe 5.

Figure 2:
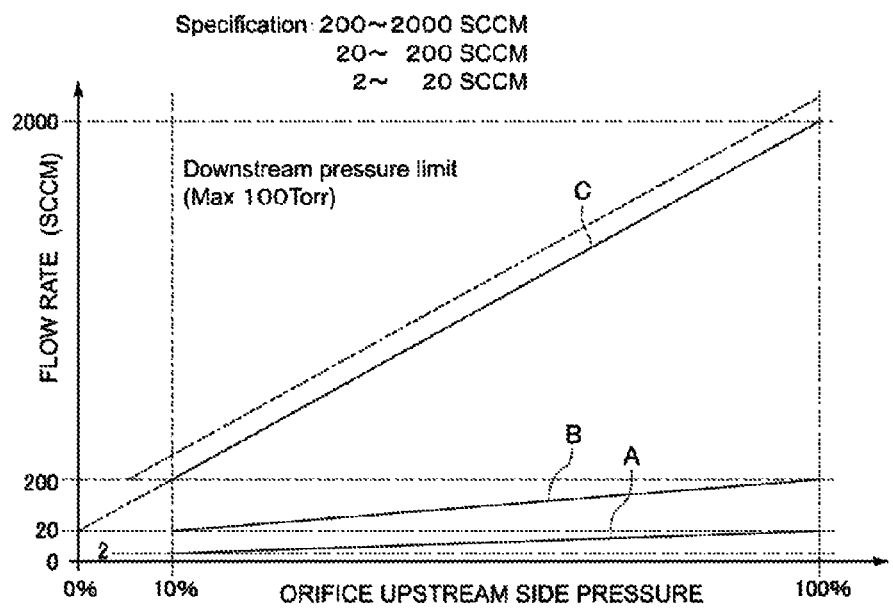
FIG. 2 is a chart showing flow rate characteristics of a flow rate control apparatus shown in FIG. 1.

More specifically, in the case that the maximum flow rate to be controlled is, for example, 2000 SCCM (Standard Cubic Centimeters per Minute), an orifice for the maximum flow rate of 20 SCCM is employed as the orifice 8a for small flow quantity, an orifice for the maximum flow rate of 200 SCCM is employed as the orifice 8b for medium flow quantity, and an orifice for the maximum flow quantity of 1780 SCCM is employed as the orifice 8c for large flow quantity, respectively. Namely, in the case that flow rate is controlled for a small flow quantity less than 20 SCCM, the switching signal $S_s$ is inputted to the control part, the driving gas Gc is sent to the No. 2 switching valve 35 by releasing No. 2 electro-magnetic switching valve 33, and the No. 2 switching valve 35 is released (while the No. 1 switching valve 34 is maintained in a state of closing). As a result, fluid flows to pipe 5 through pipe 3, orifice 8a for small flow quantity, pipe 5b, valve 35, orifice 8c for large flow quantity, pipe 5c and pipe 5d, orifice 8b for medium flow quantity, and pipe 5f, and thus the flow rate $Q_L$ of the fluid being controlled as $Q = K_L P_1$ (where $K_L$ is a constant specific to the orifice 8a for small flow quantity). Also, the flow rate characteristics of the apparatus of FIG. 1, in this case, are shown by curve A in FIG. 2. As shown, flow rate control can be performed accurately with an error of less than ±1% set point over the flow rate range of 2~20 SCCM.

In the case wherein the flow rate to be controlled is 200 SCCM (i.e., for approximately medium flow quantity), the No. 1 switching valve 34 is switched to the state of opening (i.e., opened) and the No. 2 switching valve 35 is switched to the state of closing (i.e., closed), and fluid is made to flow to the orifice 8b for medium flow quantity through pipe 3, pipe 5a, valve 34, pipe 5b and pipe 3 again, and through orifice 8a for small flow quantity. Thus, in this case, the flow rate $Q_M$ of the fluid being controlled as $Q = K_M P_1$ (where $K_M$ is a constant specific to the orifice 8b for medium flow quantity). The flow rate characteristics in this case are shown by curve B shown in FIG. 2. As shown, flow rate control can be performed accurately with an error of less than ±1% of the set point over the flow rate range of 20~200 SCCM.

In addition, in the case wherein the flow rate to be controlled is 2000 SCCM (i.e., the maximum flow rate), both switching valves 34, 35 are released through the mediation of both switching electro-magnetic valves 32, 33, and fluid is supplied to pipe 5 through pipe 3, pipe 5a, valve 34, valve 35, the orifice 8c for large flow quantity, pipe 5c and the orifice 8a for small flow quantity, the orifice 8b for medium flow quantity, and pipe 5f. In this case, the flow rate of the fluid is controlled mainly by orifice 8c for large flow quantity as a flow rate $Q_M = K_M P_1$ (where $K_M$ is a constant specific to an orifice 8c for large flow quantity). However, strictly speaking, the flow rate of pipe 5 is controlled as the sum of the flow rate $Q_M = K_M P_1$ passing through orifice 8b for medium flow quantity and the flow rate $Q_L = K_L P_1$ passing through orifice 8c for large flow quantity. Also, in this case, flow rate characteristics are shown by curve C shown in FIG. 2. As shown, the flow rate $Q_L$ can be controlled accurately with an error of less than ±1% of the set point over the flow rate range of 200~2000 SCCM.

Embodiment 2

Figure 3:
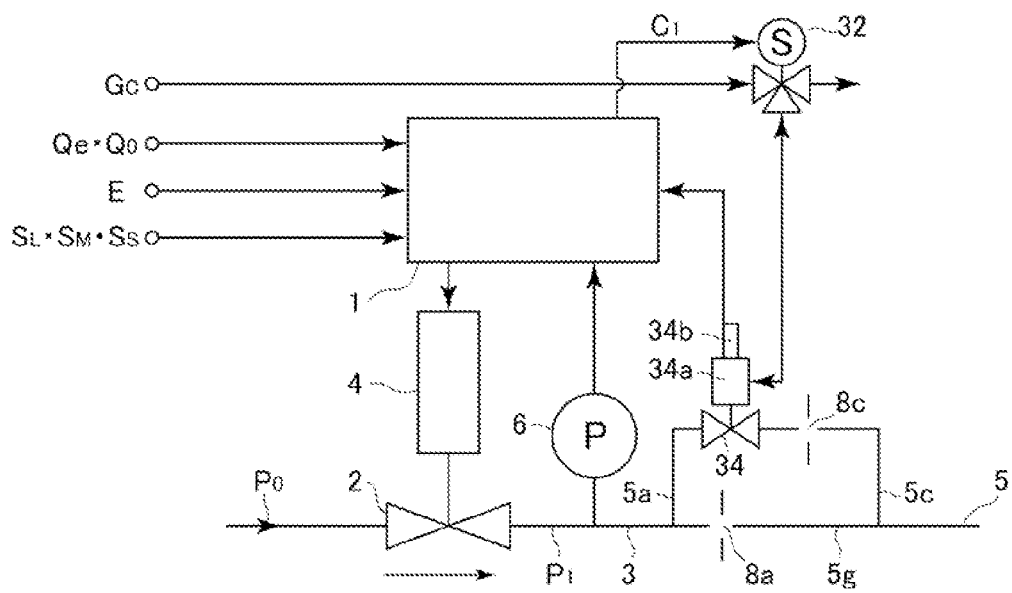
FIG. 3 is a block diagram of a flow rate range variable type flow rate control apparatus according to another embodiment of the present invention.
Figure 4:
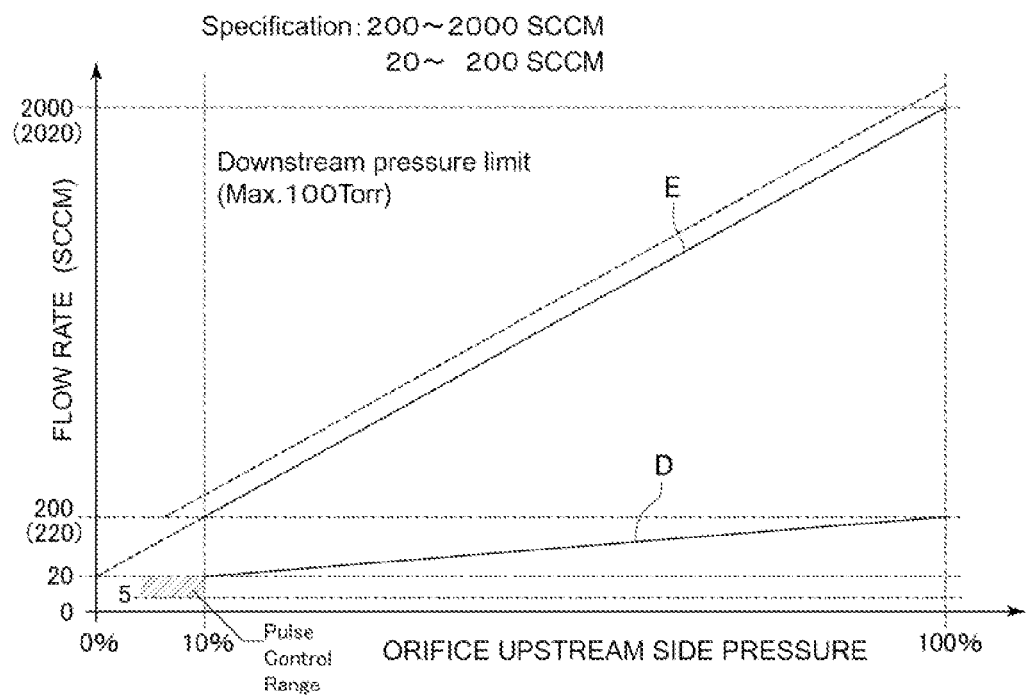
FIG. 4 is a chart showing flow rate characteristics of a flow rate control apparatus shown in FIG. 3.

FIG. 3 shows another embodiment of the present invention, wherein flow rate control is appropriately performed by employing an orifice 8a for small flow quantity and an orifice 8c for large flow quantity. For example, in the case that flow rate control for a maximum flow rate of 2000 SCCM is performed, the apparatus is constructed so that a flow rate up to 200 SCCM is controlled by the orifice 8a for small flow quantity and a flow rate up to 2000 SCCM is controlled by the orifice 8c for large flow quantity. Specifically, in the case that a flow rate of up to 200 SCCM is controlled, the switching valve 34 is maintained in a state of closing (i.e., closed), and the flow rate $Q_S$ of a fluid passing through the orifice 8a for small flow quantity is controlled as $Q_S = K_S P_1$ (where $K_S$ is a constant specific to the orifice 8a). By using the orifice 8a for small flow quantity, the flow rate can be controlled accurately with an error of less than ±1% set point over the flow rate range of 20 SCCM~2000 SCCM. Curve D in FIG. 4 shows the flow rate control characteristics for the embodiment shown in FIG. 3. In the case that the pressure in pipe 5 on the orifice downstream side is less than 100 Torr, it has been verified that the error can be reduced to less than ±1% of the set point with a flow rate of 20 SCCM.

In accordance with the afore-mentioned flow rate control apparatus shown in FIG. 3, if the orifice downstream pressure exceeds 100 Torr, or if the flow rate $Q_S$ of the fluid is found to be less than 20 SCCM although the orifice downstream side pressure is less than 100 Torr, then it becomes difficult to maintain the flow rate control error to be less than ±1% of the set point. Accordingly, in such a case, the flow rate range of less than 20 SCCM is controlled in the manner of a so-called pulse control as shown in FIG. 4. Pulse control mentioned herein is a control method wherein fluid is made to flow into pipe 3 in a pulse form by performing the opening and closing of a control valve 2 on the orifice upstream side by using pulse signals so that the flow rate of a fluid passing through the orifice 8a for small flow quantity can be controlled with comparatively high accuracy by means of adjusting the number of pulse signals opening and closing the control valve 2. On the other hand, to control the flow rate of fluid of less than 2000 SCCM, the switching valve 34 is released through the mediation of the switching electro-magnetic valve 32. Thus, the fluid is made to flow to pipe 5 through pipe 5a, switching valve 34, orifice 8c for large flow quantity, orifice 8a for small flow quantity, and pipe 5g. In particular, the flow rate of fluid flowing into pipe 5 is the sum of the flow rate $Q_C=K_C P_1$ passing through orifice 8c for large flow quantity (where $K_C$ is a constant specific to orifice 8c for large flow quantity) and the flow rate $Q_S=K_S P_1$ passing through orifice 8a for small flow quantity (where $K_S$ is a constant specific to orifice 8a for small flow quantity). The curvature of flow rate characteristics is as shown by curve E in FIG. 4.

As described above, in accordance with the first two embodiments of the present invention, the accuracy of flow rate control with an error of less than ±1% set point becomes possible over a wide flow rate control range of, for example, 2 SCCM~2000 SCCM, by means of appropriately combining orifice 8c for large flow quantity and orifice 8a for small flow quantity (or orifice 8c for large flow quantity, orifice 8b for medium flow quantity and orifice 8a for small flow quantity). A swift switching operation is required, however, to change the flow rate of a gas when the flow rate control is performed using orifice 8a for small flow quantity. In such a case, with the present invention, the pressure drop time for a pipe on the orifice secondary side can be easily shortened by installing bypass passages (5a, 34, 8c, 5c) in parallel with the flow passage in which orifice 8a is disposed, and releasing the bypass passages.

Figure 5:
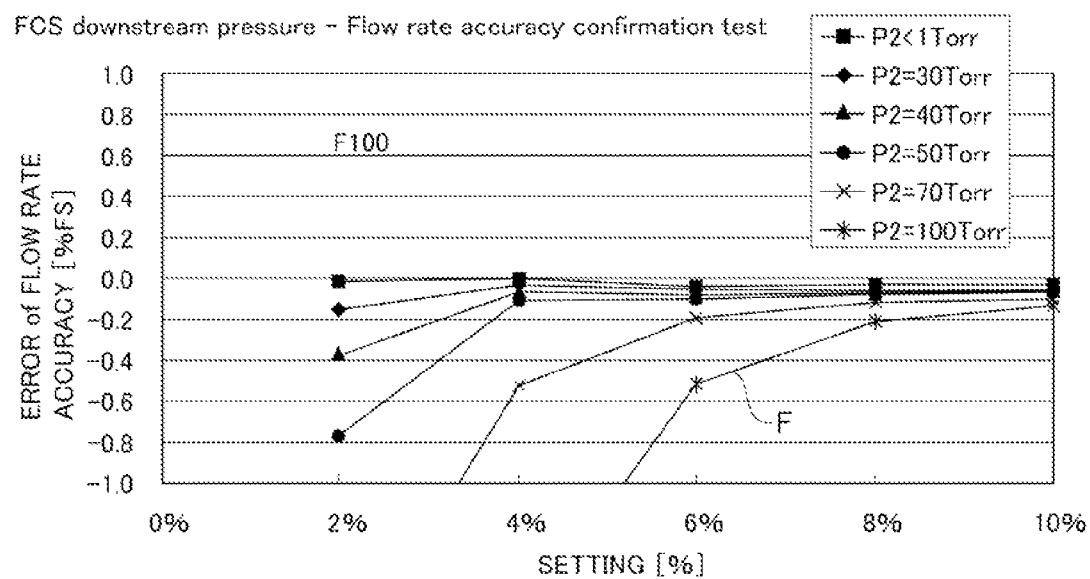
FIG. 5 graphically shows flow rate control characteristics of a pressure type flow rate control apparatus FCS outside the range of a critical condition.

Furthermore, in accordance with the two embodiments of the present invention described above, because the apparatus is constructed so that the flow rate control of fluid is performed under a critical condition, the computed flow rate Q can be converted to the flow rate of a gas in use by making use of a so-called flow factor F.F. even when a type of gas flowing is changed. Thus, it is possible that excellent properties of the pressure type flow rate control apparatus may be fully utilized. However, accuracy of flow rate control in a state outside of the critical condition of the fluid, wherein a pressure type flow rate control apparatus used in the first two embodiments of the present invention is employed, is shown in FIG. 5 wherein an orifice secondary side pressure $P_2$ is made a parameter. For example, as shown by curve F, in the case of $P_2$=100 Torr, the error exceeds −1% F.S. at a point wherein the flow rate to be controlled reaches approximately 5% of a rated set flow rate. As a result, as shown by curve D (20 SCCM~200 SCCM with orifice 8a for small flow quantity) in FIG. 4, the flow rate control can be performed surely and accurately with an error of less than ±1% of the set point between 20 SCCM~200 SCCM. However, when the flow rate to be controlled is less than 20 SCCM, it becomes difficult in practice to lower the error of less than 1% F.S. to the point of the approximate flow rate 5% (200 SCCM×5%=10 SCCM) of the set flow rate because when the flow rate to be controlled becomes less than 20 SCCM, the apparatus falls out of a critical condition at a time wherein the orifice secondary side pressure $P_2$ is 100 Torr. Accordingly, as shown in FIG. 4, in the case of a small flow quantity area (10 SCCM~20 SCCM) of 5%~10% of the set flow rate, a pulse control method can be employed. (Of course, there is no need to employ the method when an error of less than 0.1% F.S. (when a full scale of the orifice for large flow quantity is used as the standard) can be maintained.)

Embodiment 3

Figure 6:
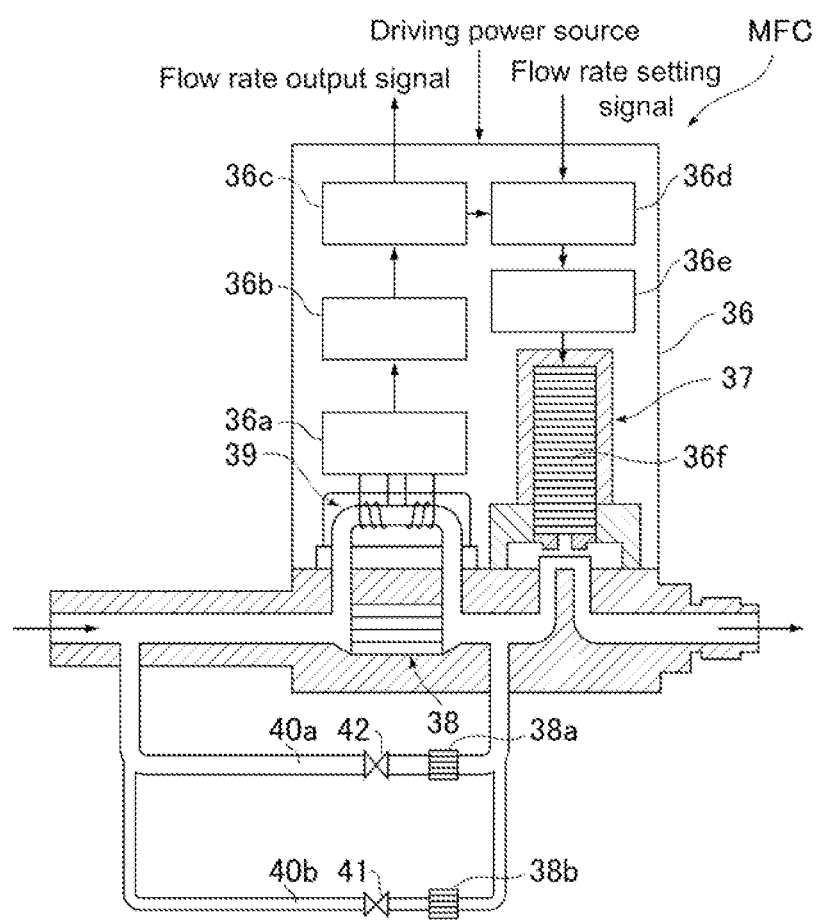
FIG. 6 is a block diagram of a flow rate range variable type flow rate control apparatus according to yet another embodiment of the present invention.
Figure 7:
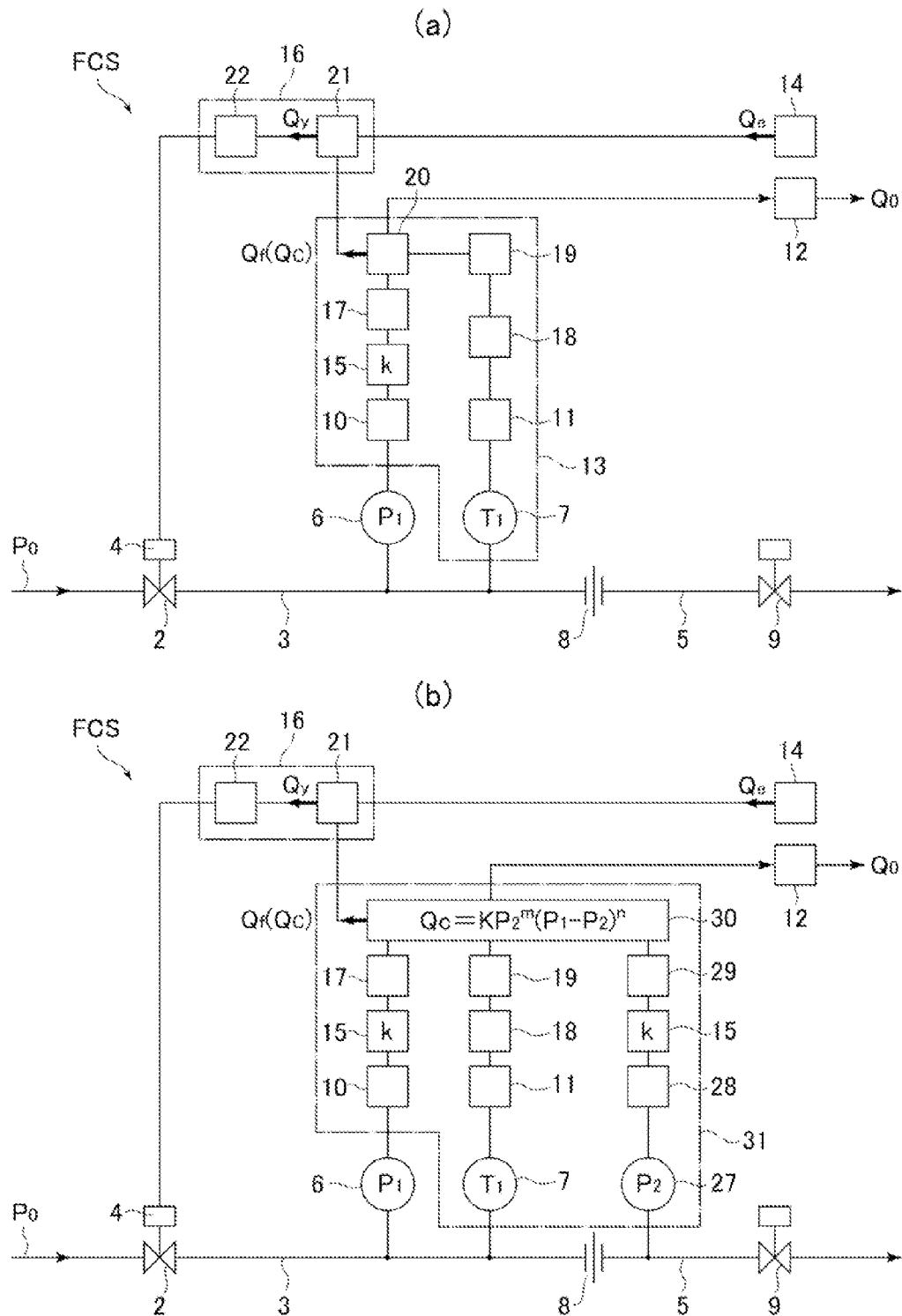
FIG. 7 is an explanatory drawing to show the basic structure of a conventional pressure type flow rate control apparatus.

FIG. 6 shows yet another embodiment of the present invention wherein a so-called thermal type mass flow rate control apparatus MFC is employed in a flow rate control apparatus. As shown in FIG. 6, the thermal type mass flow rate control apparatus comprises a control part 36, a flow rate control valve 37, a laminar flow element bypass part 38, a flow rate sensor part 39, a switching valve 41, 42, and the like. Temperature changes in proportion to a mass flow rate of a fluid are detected with a flow rate sensor part 39, and fluid of a certain set flow rate is made to flow out by controlling the flow rate control valve 37 for opening and closing based on the detected temperature. A thermal type mass flow rate control apparatus MFC itself has been disclosed. Therefore, a detail description of such is omitted here.

In FIG. 6, 36a designates a bridge circuit, 36b designates an amplification circuit, 36c designates a correction circuit, 36d designates a comparison circuit, 36e designates a valve driving circuit and 36f designates an actuator. In accordance with this embodiment of the present invention, two passages 40a, 40b are separately installed as a bypass passage of a laminar flow bypass part 38, and switching valves 41, 42 are provided on the passages 40a, 40b, respectively. In particular, a coarse laminar element 38a is provided on one fluid passage 40a of the bypass passage, which is used for flow rate control of a fluid with a medium flow quantity, while the coarser laminar element 38b is provided on the other fluid passage 40b of the bypass passage, which is used for flow rate control of fluid with a large flow quantity. Specifically, the switching valve 41 and the switching valve 42 are made to open when controlling flow rate of fluid with a large flow quantity. On the other hand, the switching valve 42 and the switching valve 41 are made to close in order to control flow rate of fluid with a small flow quantity, and the amplification level of the amplification circuit 36b of the control part 36 is switched to a level suitable for detecting a small flow quantity. Furthermore, the switching valve 41 is made to close and the switching valve 42 is made to open in order to control the flow rate of fluid with a medium flow quantity, and the amplification level and the like of the afore-mentioned amplification circuit 36b is switched to a level suitable for detecting medium flow quantity. Accordingly, a highly accurate flow rate control becomes possible over three flow rate ranges of large, medium and small flow quantities by using one set of thermal type mass flow rate control apparatus MFC wherein the afore-mentioned switching valves 41, 42 are switched, and the amplification level of the control part 36 and the like are also switched.

FEASIBILITY OF INDUSTRIAL USE

The present invention can be applied to fluid supplying facilities for various kinds of fluid used with industries such as semiconductor manufacturing, chemical goods manufacturing, pharmaceutical products manufacturing, foods processing, and the like.

What is claimed is:
1. A flow rate range variable type flow rate control apparatus comprising:
  (a) a pressure type flow rate control apparatus that operates to control flow rate Qc of fluid passing through an orifice according to the relationship Qc=KP1 when a critical condition between P1 and P2 is present, where K is a proportionality constant, or the pressure type flow rate control apparatus operates to control the flow rate Qc through the orifice according to the relationship $Qc=KP2^m(P1-P2)^n$ when the critical condition between P1 and P2 is not present, where K is the proportionality constant, and m and n are constants, wherein P1 is an orifice upstream side pressure and P2 is an orifice downstream side pressure; and (b) a first fluid passage disposed between a downstream side of a control valve and a fluid supply pipe of the pressure type flow rate control apparatus, wherein the first fluid passage includes an orifice for effecting flow control of fluid flowing in a small flow quantity range and an orifice for effecting flow control of fluid flowing in a medium flow quantity range, wherein the orifices for effecting small and medium flow quantity are in series and located between the downstream side of the control valve and the fluid supply pipe, wherein a first switching valve is parallel to the orifice for effecting flow control of fluid flowing in the small flow quantity range, wherein a second switching valve and an orifice for effecting flow control of fluid flowing in a large flow quantity range are provided in series with one another and are parallel to the orifice for effecting flow control in the medium flow quantity range, such that when the first switching valve is open and the second switching valve is closed then fluid is made to flow through the orifice for effecting flow control of fluid flowing in the medium flow quantity range and thence to the fluid supply pipe, and wherein the first and second switching valves are operably connected so that when the first switching valve and the second switching valve are open then a part of fluid flowing from the first switching valve is made to flow through the orifices for effecting flow control of fluid flowing in the medium flow quantity range and a rest of fluid flowing from the first switching valve is made to flow through the second switching valve and thence through the orifices for effecting flow control of fluid flowing in the large flow quantity range, and then respective fluid flows are fed to the fluid supply pipe, wherein the first and second switching valves are operably connected so that using only the first and second switching valves, fluid flow is controlled in three flow quantity ranges: the small flow quantity range, the medium flow quantity range, and the large flow quantity range.

2. A flow rate range variable type flow rate control apparatus as claimed in claim 1, wherein fluid flowing through the orifice for effecting flow control of fluid flowing in a small flow quantity range is fluid under the critical condition.

3. A flow rate range variable type flow rate control apparatus as claimed in claim 1, wherein when the first and second switch valves are both closed then fluid flow is directed into the orifice for effecting flow control of fluid flowing in the small flow quantity range and thence to the fluid supply pipe via the orifice for medium flow quantity.

* * * * *